United States Patent Office 3,142,667
Patented July 28, 1964

3,142,667
COUNTERCURRENT EXTRACTION OF GELATIN
Donald P. Greitie and Eldon J. Strandine, Chicago, Ill., assignors to Swift & Company, Chicago, Ill., a corporation of Illinois
No Drawing. Filed Oct. 26, 1960, Ser. No. 65,000
7 Claims. (Cl. 260—118)

The present invention relates in general to the extraction of gelatin from collagenous material. More specifically, our invention is directed to an improved hydrolytic extraction method, well suited to continuous operation, wherein gelatin of high jelly strength and viscosity is obtained from animal tissues containing collagen, such as bone, tendons, hides or skins, and connective tissue.

Prior to extraction of gelatin therefrom collagenous material is usually treated with an alkali, such as lime, or with an acid, to make the gelatin more extractable. This treatment is known as "curing" and leaves the collagenous material in a hydrated, or plumped, condition. The lime cure involves soaking gelatin stock in a saturated solution of calcium hydroxide for one to several months, after which the excess lime is removed by washing, sufficient acid is added to adjust the pH of the stock to about pH 6.0-7.5, and the washing continued to remove most of the calcium salts so formed. The lime cure removes much of the mucin. If cured by acid, the collagenous material, most often pork skins, is soaked in an acid solution (usually hydrochloric acid) containing enough acid to adjust the stock to a pH of about 3.5 to 4.2 and then washed to remove excess acid. The acid cure process removes little or no mucin. The acid cure is less time consuming and at present the largest proportion of gelatin stock is cured by this process.

The most universal method presently practiced of extracting gelatin from collagen-bearing materials is a batch process wherein the collagenous material, preferably cured, is placed in a large tank and treated for long periods in water. Several applications of water (usually five to seven), called "cooks" are made at successively increasing temperatures, the first being at about 120-130° F. and the last being at about 200° F. or higher. Extracts are drawn off after each cook, with the gel strength, viscosity, and general appearance and quality of the extracted gelatin deteriorating as each extract is made. This deterioration is due to the rapid breakdown of the gelatin molecule into smaller units when exposed to high temperatures in solution for extended periods. The total time required to substantially extract the gelatin from a batch of collagen-bearing stock, computed from the time of filling one cooking tank or kettle to the next filling, is in the neighborhood of at least 30-40 hours. This method obviously requires large cooking capacity which poses a space problem to the manufacturer in addition to the time problem. After extraction, the water containing extracted gelatin—gelatin liquor—is allowed to settle so that grease may be removed and is then filtered, concentrated, gelled, cut, dried, to the neighborhood of 10% moisture, and usually ground to a powder.

It is known that acidity catalyzes the hydrolysis of collagen to gelatin and attempts have been made to speed up the extraction process by lowering the pH of the stock to 3.5 and preferably lower (i.e., as low as 1.5). However, this solution has several disadvantages. The high acidity also catalyzes the hydrolysis of gelatin to lower molecular weight and lower test gelatin. This breakdown is so rapid that at very low pH values, e.g., below 3.5, even relatively short periods of contact with hot water produces gelatin of quite low test. In addition the lowering of the pH of the stock requires additional time and space requirements. It has been suggested that the breakdown of the gelatin caused by the high acidity can be prevented somewhat by adjusting the pH upwardly immediately after extraction. However, apart from the considerations of time and space requirements this treatment has certain drawbacks. Gelatin, or collagen, has a high buffering action and, therefore, relatively large amounts of acid would have to be added to initially lower the pH below 3.5. For example, 0.12 equivalents of acid per 100 grams are required to lower the pH of gelatin from 7 to 2. This would represent 4.4% hydrochloric acid. Assuming the pH is then adjusted upwardly from 2 to 7 with an alkali, e.g., sodium hydroxide, there would be about 7% sodium chloride present in the solution after extraction. Such large amounts of salt interfere with drying and otherwise make the gelatin less salable. The use of ion exchange resins to adjust the pH upwardly from the very low pHs is impractical because such high anion concentration reduces the cycle life of the resin to such a short time that the resin bed would be continuously down for regeneration. For the above reasons, we preferably do not treat collagen-bearing material which has been treated with sufficient acid to lower the pH below 3.5.

The principal object of our invention is to provide an improved method for extracting gelatin from collagenous material.

An additional object is to provide a method for extracting gelatin from collagen-bearing material wherein high temperature extraction is carried out yet the gelatin is of high gel strength and viscosity and of good clarity.

A further object of our invention is to provide a process for extracting gelatin whereby the period of time required for extraction is materially reduced.

Still another object of our invention is to provide a continuous method wherein gelatin is extracted from cured collagen-bearing stock in as little as one-tenth the time required with present batch methods, yet with equal or superior viscosity and gel strength and equally as good or better extraction yields.

Another object of an embodiment of our invention is to provide a method for extracting gelatin of good clarity and high test from collagen-bearing material without the necessity of a grease-separation operation on the collected gelatin liquors.

In addition to the obvious advantages seen from the attainment of the above objects, the practice of our invention effects the further advantage of substantially reducing manufacturing costs. This is achieved by:

(1) the saving in time;
(2) the saving in space which will be in direct proportion to the saving in time; and
(3) the saving in labor required since our process is capable of continuous and substantially automatic operation.

Further objects and advantages will become apparent to those skilled in the art from a reading of the following description of our invention.

We have discovered that high test gelatin can be rapidly extracted from collagen-bearing material by subjecting the collagen-bearing material to a counter-current multiple stage extraction in a plurality of extraction zones while maintaining a temperature gradient on the extraction liquid passing through the extraction zones.

We have found that if water of approximately boiling temperature is added to the first of a plurality of extraction zones containing collagenous material and cools as it passes through each successive zone containing such material (the collagenous material being "cold" when added to the extraction system, i.e., about room temperature ±10° F.), a temperature gradient will be automatically maintained within the system and gelatin in at least as good or better yields and of better quality than is produced in conventional batch cooking methods will be obtained in a brief period of time. When the above procedure is followed the calculated exit temperature of the liquors out of the system is about 150° F. (based on a ratio of 100 pounds of 70° F. stock introduced at one end of the system to 220 pounds of 212° F. water introduced at the other end of the system). However, heat losses may occur due to radiation, etc., and we have found the actual exit temperature of the liquors to be about 120–130° F. The above, then, is our preferred temperature gradient, giving substantially complete extraction of acid cured stock in about three hours and of lime cured stock in a somewhat longer time—about 4–6 hours. However, it is to be understood that it is within the scope of our invention to use water of less than 212° F. so long as it is hot enough to extract gelatin from the stock. In this regard it may be mentioned that generally speaking hotter water is required to extract gelatin from alkali cured stock than from acid cured stock and the particular lowest temperature water that can be introduced into our improved system will therefore vary depending upon the nature of the stock. If water is introduced at a lower temperature, the liquors will, of course, exit the system at a lower temperature, perhaps as low as 100° F. or slightly lower. The exit temperature should be warm enough so that the gelatin and extraction liquid are readily flowable. For most cured stocks water of from about 175° F. to boiling will extract the gelatin and will exit the system at about 100° F. or higher. It should also be understood, however, that if water of less that about boiling temperature is introduced into the system, lower gelatin yields may result if the dwell time within the extraction zones is not lengthened somewhat. For example, if water at about 190–200° F. is introduced into the system, acid cured collagenous material should remain in the system for about 4–5 hours to obtain optimum yields of gelatin.

In the procedure just discussed we speak of automatically obtaining and maintaining the temperature gradient by introducing cold stock. This is our preferred manner of obtaining a temperature gradient. It is, of course, possible to apply extraneous temperature controls. For example a thermostatically controlled heating system for the water could be used to maintain any desired water temperature in any particular one or ones of the extraction zones. Other temperature controls, known to the art, could also be employed.

Cured and washed collagenous material will contain approximately 11 to 15% extractable gelatin. For example, acid cured and hydrated pork skins having a pH of about 3.5 to 4.2 will contain about 12% extractable gelatin. In order to obtain liquors from such skins containing in the neighborhood of for example 4% gelatin solids, about three times as much liquor must be discharged from our extraction system as skins fed into the system. Since considerable liquor comes from the hydrated stock less water than three times the weight of stock would be introduced, depending on the amount of liquor calculated to be supplied from the stock. We preferably introduce the desired amount of water into the system at a rate such that a unit of the water will pass through the system in 45 minutes or less. At this rate of flow the water remains at the higher end of the temperature gradient for only a short period of time (e.g., it would not remain at boiling temperatures for more than about 5 minutes) and steadily increases in gelatin concentration and decreases in temperature as it passes through the plurality of extraction zones. By thus providing for hot water extraction, the collagenous material is fully extracted; however, the gelatin thus extracted and passing into the water is not subjected to long holding in a hot solution and is not deteriorated in jelly strength and viscosity. The gelatin extracted by our method has at least as good jelly strength as is expected in the first low temperature cooks by the batch cooking method and has high viscosities.

We have also discovered that our polyzonal countercurrent extraction method will produce gelatin liquors that are so grease-free that the conventional grease settling time of the liquors can be dispensed with provided the gelatin stock is substantially covered with the extraction water throughout its movement through the zones in a direction substantially opposite the direction of flow of the water through the zones. If this is done the fatty material can be drained off during the extraction period itself since the fat tends to accumulate in the hottest zone and drains can be situated so as to remove this fat from the top of the liquors.

The following examples are intended as illustrative only and should not be construed as limiting the scope of the disclosure.

EXAMPLE I

Gelatin stock consisting of pork skins having a pH of about 4.0 were sequentially passed through four extraction zones in one direction at a rate such that the skins moved into and through all the zones in three hours. Boiling water was metered into the system and flowed through the zones in a direction counter-current to the passage of the stock. The water exited the zones at about 130° F. The rate of flow of water was such that flow of a unit of water through all zones took about 40 minutes. Jelly strength and viscosity measurements were made on the galatin so extracted.

Both factory and laboratory conventional batch methods of extraction were carried out and jelly strength and viscosity measured after the first low temperature cooks and after all extraction cooks.

The following table shows the comparative results:

*Table I*

|  | Jelly Strength (grams) | Viscosity (millipoises) |
|---|---|---|
| Countercurrent polyzonal extraction total gelatin production | 300 | 100 |
| Batch method, laboratory, 120–130° F. cook, ½ total production | 310 | 100 |
| Batch method, factory, 120–130° F. cook | 300 | 60 |
| Batch method, laboratory, all cooks | 275 | 70 |
| Batch method, factory, all cooks | 260 | 48 |

EXAMPLE II

A tower 5" x 5" and 11 feet long was fitted with a chain hoist to lift baskets inside it from bottom to top. The baskets were open topped metal containers 4" x 4⅓" by 13" deep with perforated bottoms. Nine baskets were introduced into the system, one every 20 minutes, so that each basket was in the tower for 3 hours. Each basket was filled with cured gelatin stock while liquors from the tower flowed through it. Cured stock shrinks quickly in volume when heat is applied, so that the capacity of an individual basket is greatly increased by filling while the hot liquors are flowing therethrough. Boiling water was introduced at the top of the tower and the extraction water percolated down through the baskets of gelatin stock. Gelatin liquors flowed from the bottom basket at about 120° F. and contained 4% gelatin. The gelatin recovered had the following characteristics:

Jelly strength _____grams__ 302
Viscosity _____millipoises__ 97

The skins were as completely extracted as by the batch process.

EXAMPLE III

Six 2-liter, 3-necked flasks were connected in series so that liquors must pass from the bottom of one flask to the top of the next. The necks of each flask were provided with vapor and liquid tight closures. Water was pumped through a heat exchanger into one end of the series of flasks and cold acid cured pork skins fed into the other end while the hot liquors from the last flask was flowing in the flask being filled. Since cured skins shrink as soon as they are warmed 2000 gms. of cured skins can be fed into a 2000 ml. flask without crowding. A flask containing 2000 gms. of cured skins was introduced into the countercurrent system every 30 minutes and each flask was in the system 3 hours. Boiling hot water was pumped in at a rate of 4200 ml. per 20 minutes. The liquors from the system contained 3.6% gelatin which tested as follows:

| | |
|---|---|
| Jelly strength _____ gms__ | 299 |
| Viscosity _____ millipoises__ | 83 |
| pH _____ | 3.9 |

Water covered the stock at all times in this extraction and the liquors obtained were so free of fat that no settling time was required before filtration, whereas a settling time was required in Example II.

Obviously many modifications and variations of the invention as hereinbefore set forth may be made without departing from the spirit and scope thereof and therefore only such limitations should be imposed as are indicated in the appended claims.

We claim:

1. The method of extracting gelatin from collagenous material which comprises: controlling the temperature of aqueous extraction liquid substantially continuously flowing through a plurality of extraction zones whereby to maintain a temperature gradient on the liquid throughout said zones, said temperature gradient ranging from above about 175° F., which is sufficient to extract gelatin from the collagenous material to a lower temperature which is below about 150° F., but effective to maintain extracted gelatin and the aqueous extraction liquid in a readily flowable condition; countercurrently contacting said collagenous material sequentially with the liquid in each of said zones whereby to extract a portion of gelatin from said material in each zone, said contact of collagenous material with said liquid in said zones commencing at the lower temperature end of said temperature gradient and terminating at the higher temperature end thereof; and collecting the aqueous extraction liquid including gelatin.

2. The method of extracting gelatin from collagenous material which comprises: controlling the temperature of an aqueous extraction liquid flowing in a given direction through a plurality of extraction zones toward a predetermined point whereby to maintain a temperature gradient of said flowing liquid, said temperature gradient ranging from above about 175° F., which is sufficient to extract gelatin from said collagenous material as said liquid enters the first of said plurality of zones to a lower temperature which is below about 150° F., but effective to maintain extracted gelatin and extraction liquid in a readily flowable condition as said liquid reaches said predetermined point; sequentially passing an amount of said collagenous material through said zones in a direction substantially opposite to said given direction whereby a portion of gelatin will be extracted from said material in each zone; and collecting said liquid including gelatin when said liquid reaches said predetermined point.

3. The method of extracting gelatin from collagenous material having a pH of above about 3.5 which comprises: controlling the temperature of water flowing in a given direction through a plurality of extraction zones toward a predetermined point whereby to maintain a temperature gradient of said flowing water of above about 175° F. as it enters the first of said plurality of zones to a temperature between about 100° F. and 130° F. as it reaches said predetermined point; sequentially passing an amount of said collagenous material through said zones in a direction substantially opposite to said given direction whereby a portion of gelatin will be extracted from said material in each zone; and collecting said water including gelatin when said water reaches said predetermined point.

4. The method of claim 3 wherein said material is substantially covered by said water throughout the sequential passage through said zones.

5. The method of claim 3 wherein a predetermined unit of said water flows from the first of said plurality of zones to said predetermined point in less than about 45 minutes.

6. The method of extracting gelatin from collagenous material which comprises: forming a stream of water flowing from a first point to a second point through a plurality of extraction zones, the temperature of said water at said first point being above about 175° F., the temperature of said water at said second point being within the range of about 100–150° F., sequentially passing said collagenous material through said plurality of zones from said second point to said first point whereby a portion of gelatin will be extracted from said material in each of said zones; and collecting said water including extracted gelatin at said second point.

7. The method of claim 6 wherein a unit of water flows from said first point to said second point in less than about 45 minutes.

References Cited in the file of this patent

UNITED STATES PATENTS

| | | |
|---|---|---|
| 2,397,650 | DeBeukalaer _____ | Apr. 2, 1946 |
| 2,575,551 | Frechin _____ | Nov. 20, 1951 |
| 2,751,377 | Keil et al. _____ | June 19, 1956 |